United States Patent [19]

Brouwer

[11] Patent Number: 5,531,524

[45] Date of Patent: Jul. 2, 1996

[54] SELF-ADJUSTING BEARING

[75] Inventor: Douglas J. Brouwer, Sheboygan, Wis.

[73] Assignee: Kohler Co., Kohler, Wis.

[21] Appl. No.: 300,027

[22] Filed: Sep. 2, 1994

[51] Int. Cl.⁶ ................................................. F16C 27/02
[52] U.S. Cl. ........................ 384/220; 384/125; 384/276
[58] Field of Search ..................................... 384/125, 192, 384/202, 215, 220, 222, 247, 276, 280, 281, 297–300, 302

[56] References Cited

U.S. PATENT DOCUMENTS

| | | | |
|---|---|---|---|
| 137,444 | 4/1973 | Hermance | 277/216 |
| D. 227,397 | 6/1973 | Steinke | D15/143 |
| 1,483,903 | 2/1924 | Masury | 384/215 X |
| 2,851,314 | 9/1958 | Thomson | 384/222 |
| 2,897,026 | 7/1959 | Haller et al. | 384/125 |
| 2,931,412 | 4/1960 | Wing | 384/125 X |
| 2,986,372 | 5/1961 | Yocum | 251/214 |
| 3,318,642 | 5/1967 | Peterson | 384/215 |
| 3,322,475 | 5/1967 | Schick | 384/138 |
| 3,348,887 | 10/1967 | Sheps | 384/220 |
| 3,438,686 | 4/1969 | Stone | 384/296 |
| 3,503,415 | 3/1970 | De Angelis et al. | 137/375 |
| 3,601,459 | 8/1971 | Cutting | 384/222 X |
| 3,807,455 | 4/1974 | Farrell | 137/625.31 |
| 3,991,974 | 11/1976 | Bonafous | 251/306 |
| 4,336,919 | 6/1982 | Hall | 251/214 |
| 4,429,885 | 2/1984 | Chiba et al. | 277/140 |
| 4,548,416 | 10/1985 | Maeda | 277/140 |
| 4,651,770 | 3/1987 | Denham et al. | 137/270 |
| 4,759,530 | 7/1988 | Iff | 251/306 |
| 4,764,035 | 8/1988 | Boyd | 384/152 |
| 4,821,765 | 4/1989 | Iqbal et al. | 137/270 |
| 4,899,432 | 2/1990 | Adam et al. | 29/596 |
| 4,899,982 | 2/1990 | Lange | 251/214 |
| 4,913,562 | 4/1990 | Rosen | 384/276 |
| 5,145,265 | 9/1992 | Flem | 384/296 |
| 5,238,252 | 8/1993 | Stewen et al. | 277/60 |
| 5,314,165 | 5/1994 | Raymond | 251/305 |
| 5,332,361 | 7/1994 | Bras et al. | 415/231 |

FOREIGN PATENT DOCUMENTS

| | | | |
|---|---|---|---|
| 2646781 | 10/1976 | Germany | 251/214 |
| 191319 | 11/1983 | Japan | 384/276 |
| 13019 | 1/1986 | Japan | 384/276 |
| 226287 | 7/1943 | Switzerland | 384/276 |

*Primary Examiner*—Thomas R. Hannon
*Attorney, Agent, or Firm*—Quarles & Brady

[57] ABSTRACT

A resilient annular bearing positionable around a rotating shaft which self-adjustingly stabilizes the shaft with respect to a sleeve in which the shaft rotates. The bearing has opposite undulating surfaces, made up of a series of alternating peaks and valley, which provide resiliency. The opposite undulating surfaces extend radially, axially or obliquely to provide radial or axial stabilization or both. The peaks may be plateaued or shaped like a truncated pyramid.

4 Claims, 3 Drawing Sheets

5,531,524

SELF-ADJUSTING BEARING

FIELD OF THE INVENTION

The invention relates to annular bearings positionable around rotatable shafts.

BACKGROUND

A bearing, typically made of lubricious material, may be placed around a rotatable shaft to fit between a ledge or shoulder of that shaft and a surface which is not rotating or is rotating relative to the shaft. The shaft may, for example, be the stem of a valve and the non-rotating surface may be a ledge or shoulder of a valve housing in which the stem is rotating. Because of manufacturing variations, the axial dimensions of the stem and the housing may vary from valve to valve, as a result of which a particular valve may have either excessive stem wobble or excessive friction. There is a need for a bearing which will self-adjust for such axial variations and yet provide a bearing surface having the desired friction characteristics.

In other applications, a bearing, also typically made of a lubricious material, may be placed between a rotatable shaft and a sleeve in which the shaft rotates in order to reduce friction and facilitate rotation. For example, the shaft and the sleeve may be a stem and a housing of a valve. Because of manufacturing tolerances in the radial dimensions of the shaft and/or the sleeve, a given bearing may result in a loose fit in which the shaft may wobble or in a tight fit in which friction is greater than desired. There is, therefore, a need for a bearing which will self-adjust for radial variations and thereby minimize shaft wobble and yet provide satisfactory friction characteristics.

In still other applications, there may be a need for such a bearing which will self-adjust for both radial and axial variations and yet provide satisfactory friction characteristics.

SUMMARY OF THE INVENTION

The present invention is directed to meeting these needs.

In one aspect of the invention, there is provided a bearing which may be positioned around a shaft that is rotatable in a coaxial sleeve. The bearing mediates between a lateral surface that rotates with the shaft and another surface with respect to which the lateral surface is in relative movement. The bearing, which is a generally ring-shaped member, has an upper undulating surface with a first set of axially extending peaks and valleys and a lower undulating surface with a second set of axially extending peaks and valleys. Further, the generally ring-shaped member has an adjustable top-to-bottom height, and the bearing is sufficiently flexible such that its height can be changed in response to axially exerted force.

In another aspect, the invention provides a bearing which may be positioned around a shaft that is rotatable in a coaxial sleeve such that the bearing mediates between a circumferential outer surface of the shaft and a circumferential inner surface of the sleeve. The bearing, which is a generally ring-shaped member, has a radially-outwardly undulating surface with a first set of radially extending peaks and valleys and a radially-inwardly undulating surface with a second set of radially extending peaks and valleys. Further, the bearing is sufficiently flexible such that its radial width can be changed in response to radially exerted force.

In a further aspect, there is provided a bearing which may be positioned around a shaft that is rotatable in a coaxial sleeve such that the bearing mediates between a lateral surface that rotates with the shaft and another surface with respect to which the lateral surface is in relative movement and further mediates between a circumferential outer surface of the shaft and a circumferential inner surface of the sleeve. Further, the bearing, which comprises a generally ring-shaped member, has an upper undulating surface with a first set of extending peaks and valleys a lower undulating surface with a second set of extending peaks and valleys. At least one of the upper and lower undulating surfaces is generally oriented in a plane which is at an oblique angle relative to a radial plane of the generally ring-shaped member. Further, the bearing is sufficiently flexible such that its height and radial width can be changed in response to axially and radially exerted forces.

In other aspects, the undulations of the peaks and valleys of the two surfaces of the bearing are out of phase with each other. Further, at least one peak may be a plateau that forms a bearing surface, and that peak may be in the form of a truncated pyramid. The bearings may be in the form of a continuous ring or a split ring. The bearings may be used between a valve stem and a valve housing.

The objects of the invention therefore include:

(a) providing a bearing that will self-adjust for radial dimension variations while maintaining desired friction characteristics;

(b) providing a bearing that will self-adjust for axial dimension variations while maintaining desired friction characteristics; and (c) providing a bearing that will self-adjust for radial and axial dimension variations while maintaining desired friction characteristics.

These and other features, aspects, objects and advantages of the invention will be apparent from the description which follows. In the detailed description below, preferred embodiments of the invention will be described with reference to the accompanying drawings. These embodiments do not represent the full scope of the invention claimed herein. Rather, the invention may be employed in other embodiments.

DESCRIPTION OF THE EMBODIMENTS

Figure 1:
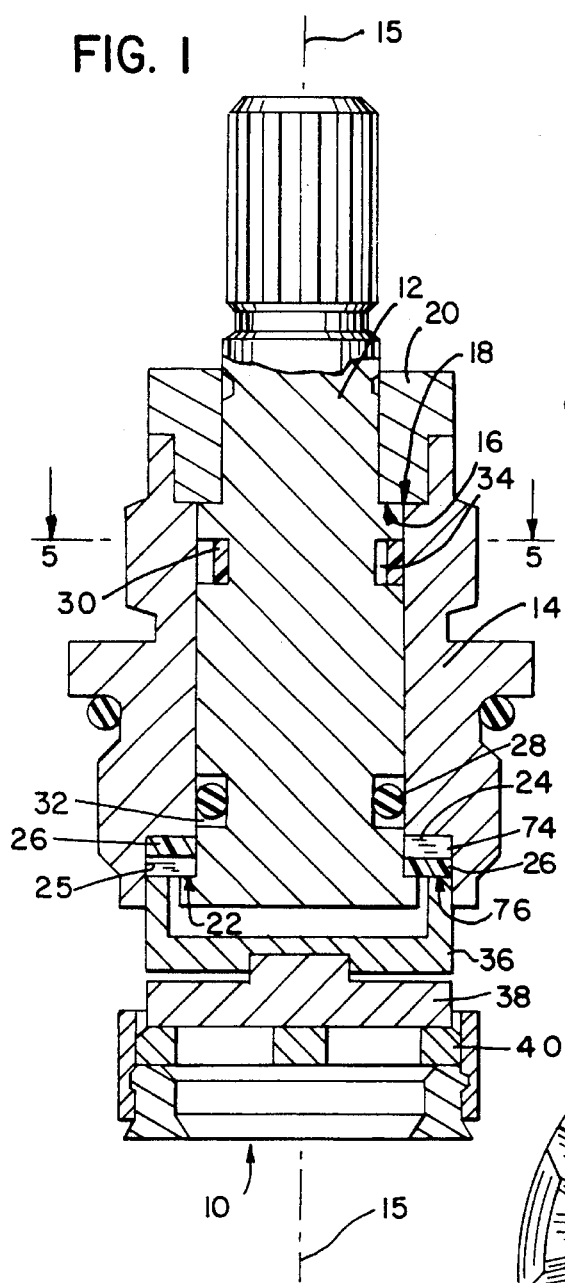
FIG. 1 is a side, partially sectional, view of a valve in which embodiments of the invention may be employed.

FIG. 1 is a cross-sectional view of a cartridge valve 10 of a type used in a faucet. A rotatable shaft in the form of a cylindrically shaped, radially-terraced and grooved valve stem or spindle 12 is positioned within a coaxial, cylindrically shaped, multiple-diameter sleeve in the form of a valve cartridge or housing 14. The common axis of the stem and the housing is shown at element 15 in FIG. 1. Vertical reference terms such as "up" and "down", and the term "axial", refer to relative positions along axis 15, and in different embodiments axis 15 need not be vertical. Horizontal reference terms and the term "radial", refer to relative positions perpendicular to axis 15, whether or not horizontal.

As further shown in FIG. 1, the stem 12 is axially constrained in part by the interference between its intermediately positioned radial ledge 16 and an annular end 18 of a bushing 20 (which is affixed to the valve housing 14 by a fastening means not shown). The axial constraint of the stem 12 is completed by the interference between an endwise radial flange 22 of the stem 12 and the ceiling 24 of an radial indentation 25 at the bottom of the housing 14, this interference being mediated by the axial bearing 26 which will be described below.

The stem 12 and the housing 14 are dimensioned to provide a slight gap (not shown) between them so that the stem 12 can rotate within the housing 14. Radial constraint on the stem 12 is provided by an annular seal in the form of O-ring 28 and the radial bearing 30, which are positioned around the stem in its lower and upper annular grooves 32 and 34 respectively. The O-ring 28 and the radial bearing 30 provide the main bearing surfaces between the stem 10 and the housing 14.

By rotating a knob (not shown) attached to the top of the stem 12, a user can rotate the stem 12, which in turn rotates valve members 36 and 38 which are carried and driven at the bottom of the stem 12 and which cooperate with stationary valve member 40, in ways not relevant to the present invention, to control the flow of liquid through the valve 10.

Figure 2:
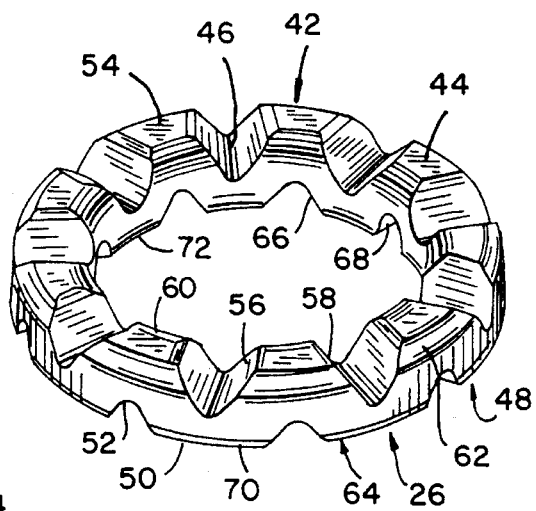
FIG. 2 is a perspective view of an embodiment of the invention which self-adjusts for axial variations.
Figure 3:
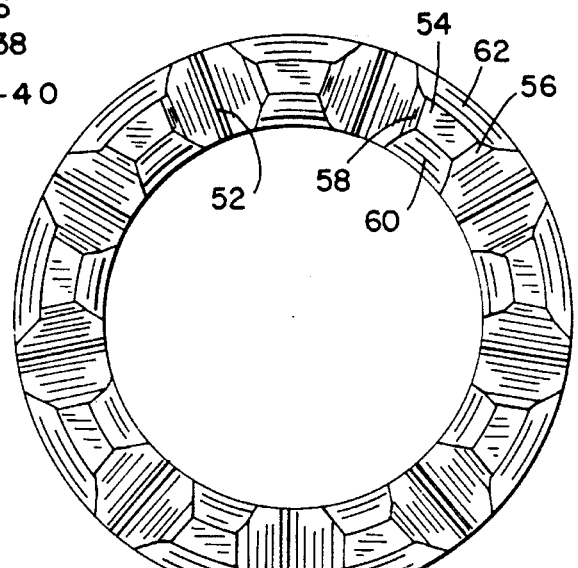
FIG. 3 is a top plan view of the bearing of FIG. 2.
Figure 4:
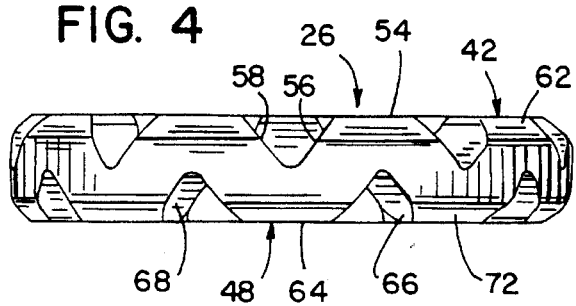
FIG. 4 is a side elevational view of the bearing of FIG. 2.

An axial bearing 26 which self-adjusts for axial dimensional variations is illustrated in FIGS. 2, 3 and 4. It is a generally ring shaped member having an undulating upper surface 42 formed by a series of axially extending peaks 44 and valleys 46 and an undulating lower surface 48 formed by a series of axially extending peaks 50 and valleys 52. The "waveforms" of the undulating upper surface 42 and the undulating lower surface 48 are out of phase with each other. Though shown as a closed ring in FIGS. 2, 3 and 4, the axial bearing 26 could be split, especially if it were radially restrained, if a split ring were desirable for assembly or other reasons.

Each upper peak 44 may, but need not be, in the form of a plateau 54 set on walls 56, 58, 60 and 62 which slant toward each other to meet the plateau 54. Each lower peak 50 may, but need not be, in the form of a plateau 64 set on walls 66, 68, 70 and 72 which slant toward each other to meet the plateau 64. The plateaus 54 and 64 may be flat or rounded. In each case, the resulting shape may approximate that of a truncated rectangular-base pyramid.

Each valley 46, 52 is formed by adjacent slanting walls 56, 58 and 66, 68 respectively.

The number of peaks and valleys, their heights and depths, the angles of the slanted walls, the surface areas of the plateaus and other features may be differ from the embodiment of FIGS. 2, 3 and 4, depending on the size of the bearing, the material used, the desired degree of stiffness, and other factors.

The axial bearing 26 is positioned around the stem 12 so as to fit in the gap 74 between (a) the ceiling 24 of the housing indentation 25 and (b) both the flange 22 of the stem 12 and the top edge 76 of the moving valve member 36. The height of the gap 74 may vary from valve to valve because of variations in the dimensions of the valve parts. As a result of its undulating design and resilient material, the height of the axial bearing 26 is variable and is determined by the height of the gap 74, and the axial bearing 26 exerts axial spring force against the stem 12, thereby stabilizing it and reducing wobble.

In operation in the valve 10, when the stem 12 rotates, the axial bearing 26 and the moveable valve member 38 rotate with it. As a result, the upper surface 42 of the axial bearing 26 slides along the ceiling 24 of the housing indentation 25.

The desired degree of stability of the stem 12 and the desired amount of friction can be achieved by appropriate selection of the height, material and shape of the axial bearing 26. The area of the plateaus 50 is an important determinant of friction characteristics.

Figure 6:
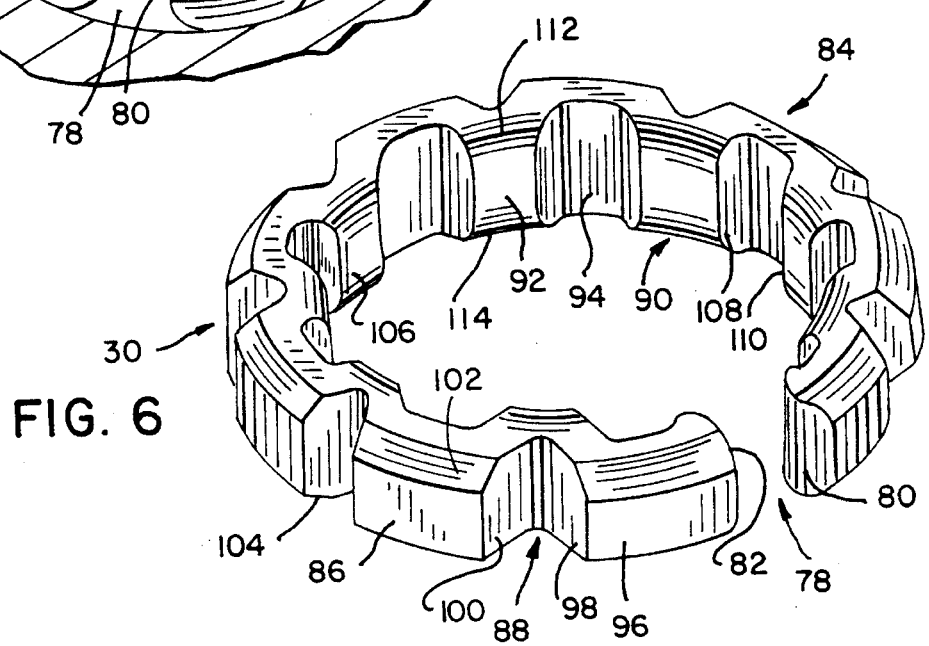
FIG. 6 is a perspective view of the bearing of FIG. 5.
Figure 7:
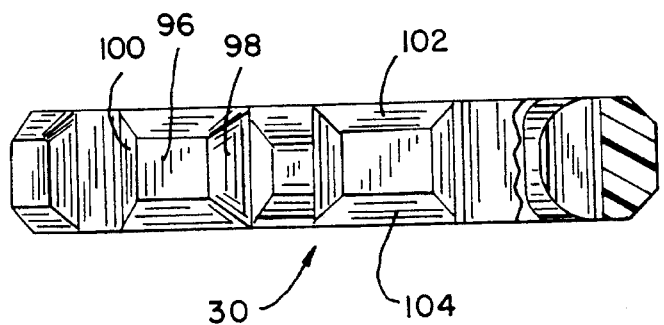
FIG. 7 is a side elevational view of bearing of FIG. 5.
Figure 8:
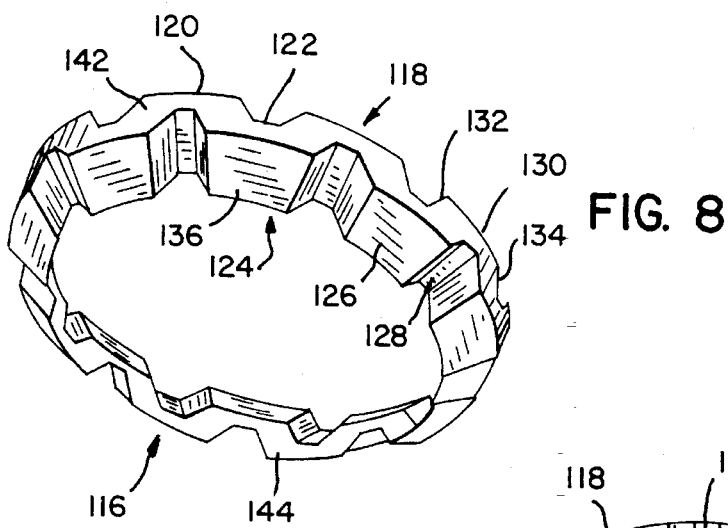
FIG. 8 is a perspective view of an embodiment which self-adjusts for radial and axial variations.

A radial bearing 30 for self-adjusting for radial dimension variations is illustrated in FIGS. 6, 7 and 8. It is an unclosed, generally ring shaped member having a gap 78 between its two ends 80 and 82. It has a radially-outward surface 84 formed in an undulating shape by a series of radially extending peaks 86 and valleys 88 and a radially-inward surface 90 formed in an undulating shape by a series of radially extending peaks 92 and valleys 94. The "waveforms" of the undulating outward 84 and inward 90 surfaces are out of phase with each other.

Each outer peak 86 may, but need not be, in the form of a plateau 96 set on walls 98, 100, 102 and 104 which slant toward each other to meet the plateau 96. Each inner peak 92 may, but need not be, in the form of a plateau 106 set on walls 108, 110, 112 and 114 which slant toward each other to meet the plateau 96. In each case, the resulting shape of the plateaus approximates that of a truncated rectangular-base pyramid. The plateaus may be flat or rounded circumferentially and/or radially.

Each valley 88, 94 is formed by adjacent slanting walls 98, 100 and 108, 110 respectively.

Figure 5:
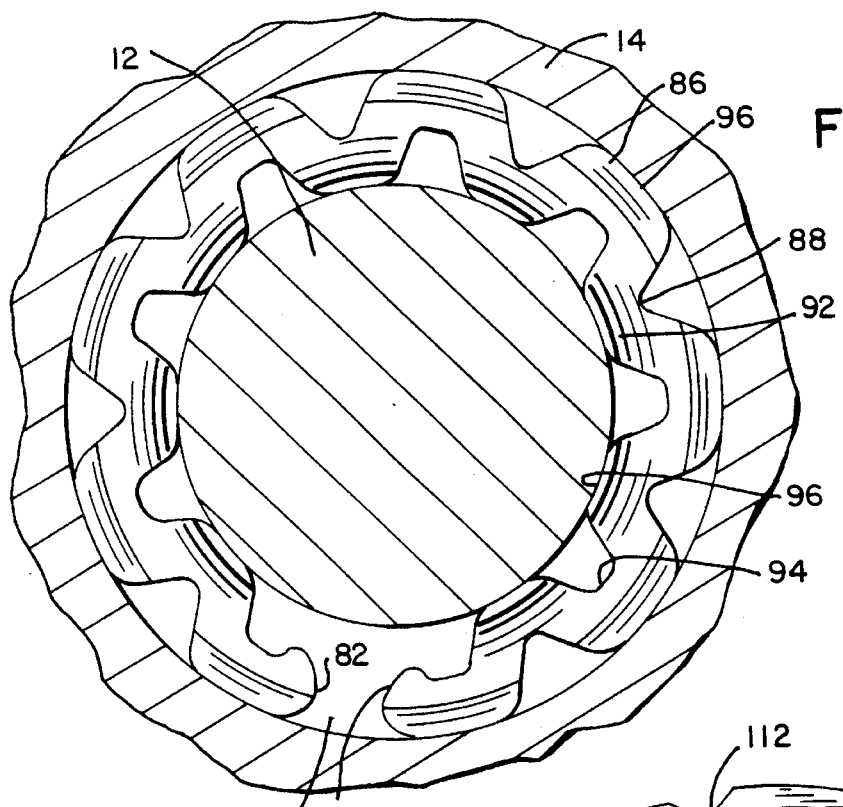
FIG. 5 is a top plan view of an embodiment of the invention which self-adjusts for radial variations, shown as a cross-sectional view taken on plane 5—5 of FIG. 1.

The number of peaks and valleys, their heights and depths, the angles of the slanted walls, the surface areas of the plateaus and other features may be differ from the embodiment of FIGS. 5, 6 and 7, depending on the size of the bearing, the material used, the desired degree of stiffness, and other factors. The radial bearing 30 may be a closed ring rather than the split ring shown. A closed ring would be stiffer than a comparable split ring.

The radial bearing 30 is positioned around the stem 12 in the upper groove 34 of the stem 12. It is sized so that its radially-outward surface 84 will extend out of the upper groove 34, fill the gap (not shown) between the stem 12 and the housing 14 and be in contact with the interior of the housing 14. The width of the gap (not shown) varies from valve to valve because of variations in the dimensions of the valve parts. As a result of the undulating design and resilient material of the radial bearing 30, its radial width is variable and is determined by width of the gap (not shown) between the stem 12 and the housing 14. Compressed between the stem 12 and the housing 14, the radial bearing 30 exerts a radial spring force against the stem 12, thereby stabilizing it and reducing wobble.

The retention of the radial bearing 30 need not be achieved by means of a groove in a rotating shaft. It could be retained by a groove in a sleeve.

In operation of the valve 10, when the stem 12 rotates, the radial bearing 30 rotates with it. As a result, the outward surface 84 of the radial bearing 30 slides along the inner surface of the housing 14.

The desired degree of stability of the stem 12 and the desired amount of friction can be achieved by appropriate selection of the radial width, material and shape of the radial bearing 30. The area of the plateaus 96 is an important determinant of friction.

Figure 9:
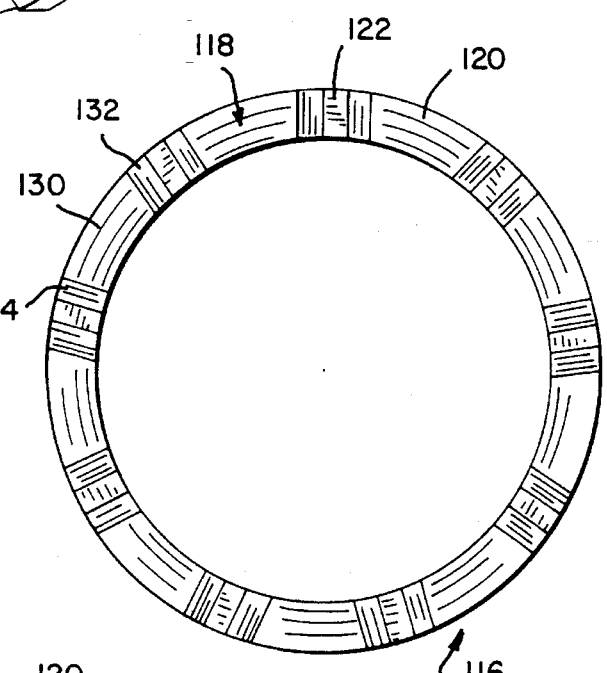
FIG. 9 is a top plan view of the bearing of FIG. 8.
Figure 10:
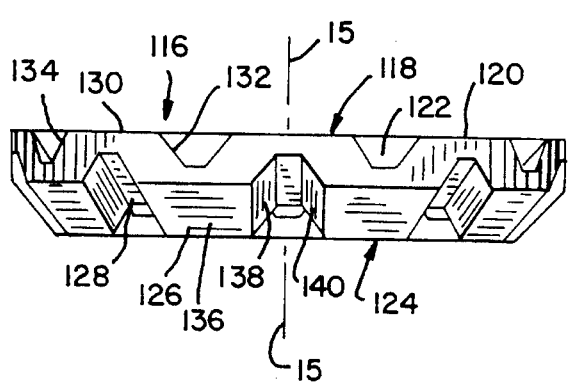
FIG. 10 is a side elevational view of the bearing of FIG. 8.

FIGS. 8–10 illustrate a bearing 116 which self-adjusts for both axial and radial dimensional variations. It is a generally ring shaped member having an undulating upper surface 118 formed by a series of peaks 120 and valleys 122 and an undulating lower surface 124 formed by a series of peaks 126 and valleys 128. The surfaces 118 and 124 are generally aligned with a plane which is at an oblique angle to the radial plane of the generally ring-shaped member, the radial plane being perpendicular to the axis 15 of the generally ring-shaped member. In FIGS. 8–10 the planes of surfaces 118 and 124 are each at a 45 degree angle to the radial plane, though other angles may be employed as well. The "waveforms" of the undulating upper surface 118 and the undulating lower surface 124 are out of phase with each other. Though shown as a closed ring in FIGS. 8–10, the bearing 116 could be split.

Each upper peak 120 may, but need not be, in the form of a plateau 130 set on walls 132 and 134 which slant toward each other to meet the plateau 130. Each lower peak 126 may, but need not be, in the form of a plateau 136 set on walls 138 and 140 which slant toward each other to meet the plateau 136. The plateaus 130, 136 may be flat or rounded. The other two walls 142, 144 supporting each of the plateaus 130, 136 may also slant toward each other so that the resulting shape approximates that of a truncated rectangular-base pyramid.

Each valley 122, 128 is formed by adjacent slanting walls 132, 134 and 138, 140 respectively.

The number of peaks and valleys, their heights and depths, the angles of the slanted walls, the surface areas of the plateaus and other features may be differ from the embodiment of FIGS. 8, 9 and 10 depending on the size of the bearing, the material used, the desired degree of stiffness, and other factors.

Figure 11:
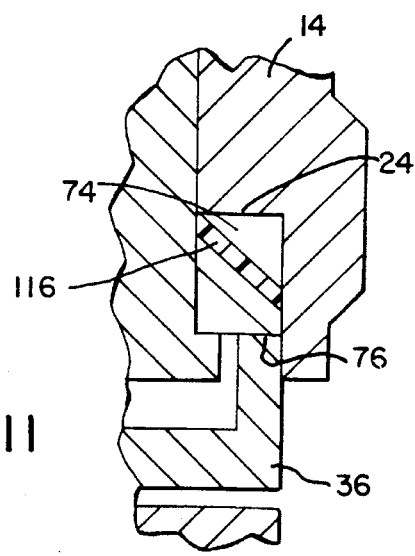
FIG. 11 is a detail of part of the valve of FIG. 1 with a sectional view of the bearing of FIG. 8.

FIG. 11 shows the bearing 116 in place in the gap 74 of the valve of FIG. 1. It is flexible and resilient both radially and laterally.

The bearings 26, 30 and 116 may be made of a resilient and lubricious material. When used in a plumbing valve such as illustrated in FIG. 1, an acetyl, a co-polymer acetyl and a teflon filled acetyl have been found to be advantageous. Other materials, including but not limited to nylon and glass-reinforced plastic, may be use for such an application and for other applications.

An important feature of the invention is that is may provide a bearing that will self-adjust for axial dimension variations, a bearing that will self adjust for radial dimension variations and a bearing that will self-adjust for both types of dimension variations, thereby reducing shaft wobble while maintaining friction within a desired range.

While preferred embodiments have been described above, those skilled in the art will recognize that other embodiments will be within the spirit and scope of the invention. For example, while the invention is shown as used in a plumbing valve, it may be used in other types of valves and in non-valve applications which involve a shaft rotating in a sleeve. Also, the specific materials mentioned are not the only materials which can be used. All such and other changes from the embodiments described herein are mean to be within the scope of the invention.

I claim:

1. A bearing positionable around a shaft that is rotatable in a coaxial sleeve such that the bearing mediates between a circumferential outer surface of the shaft and a circumferential inner surface of the sleeve, the bearing comprising a generally ring-shaped member having:

a radially-outwardly undulating surface with a first set of radially extending peaks and valleys;

a radially-inwardly undulating surface with a second set of radially extending peaks and valleys; and wherein the bearing is sufficiently flexible such that its radial width can be changed in response to radially exerted force and wherein at least one peak is a plateau that forms a bearing surface, said at least one peak being in the form of a truncated pyramid.

2. The bearing of claim 1, wherein undulations of the first and second sets of peaks and valleys are out of phase with each other.

3. The bearing of claim 1, wherein the generally ring-shaped member is a continuous ring.

4. The bearing of claim 1, wherein the generally ring-shaped member is a split ring.

* * * * *